(12) United States Patent
Korchev et al.

(10) Patent No.: US 10,367,202 B2
(45) Date of Patent: Jul. 30, 2019

(54) ELECTRODES, COMPOSITIONS, AND DEVICES HAVING HIGH STRUCTURE CARBON BLACKS

(71) Applicant: Cabot Corporation, Boston, MA (US)

(72) Inventors: Andriy Korchev, Westford, MA (US); Aurelien L. DuPasquier, Westford, MA (US); Miodrag Oljaca, Concord, MA (US); Geoffrey D. Moeser, Groton, MA (US)

(73) Assignee: Cabot Corporation, Boston, MA (US)

( * ) Notice: Subject to any disclaimer, the term of this patent is extended or adjusted under 35 U.S.C. 154(b) by 100 days.

(21) Appl. No.: 15/586,670

(22) Filed: May 4, 2017

(65) Prior Publication Data

US 2017/0324096 A1    Nov. 9, 2017

Related U.S. Application Data

(60) Provisional application No. 62/332,142, filed on May 5, 2016.

(51) Int. Cl.
| | |
|---|---|
| *H01M 4/62* | (2006.01) |
| *C09C 1/50* | (2006.01) |
| *C09C 1/56* | (2006.01) |
| *H01G 11/42* | (2013.01) |
| *H01G 11/46* | (2013.01) |
| *H01M 4/505* | (2010.01) |
| *H01M 4/525* | (2010.01) |

(Continued)

(52) U.S. Cl.
CPC ............... *H01M 4/625* (2013.01); *C09C 1/50* (2013.01); *C09C 1/56* (2013.01); *H01G 11/42* (2013.01); *H01G 11/46* (2013.01); *H01M 4/505* (2013.01); *H01M 4/525* (2013.01); *H01M 10/0525* (2013.01); *C01P 2002/60* (2013.01); *C01P 2002/82* (2013.01); *C01P 2004/64* (2013.01); *C01P 2006/12* (2013.01); *C01P 2006/19* (2013.01); *C01P 2006/22* (2013.01); *C01P 2006/40* (2013.01); *H01M 2004/021* (2013.01)

(58) Field of Classification Search
CPC ... H01M 4/625; H01M 4/505; H01M 10/0525
See application file for complete search history.

(56) References Cited

U.S. PATENT DOCUMENTS

| | | | |
|---|---|---|---|
| 2006/0188777 A1* | 8/2006 | Kaneta ................ | H01M 2/266 429/128 |
| 2013/0130113 A1 | 5/2013 | Takano et al. | |

(Continued)

OTHER PUBLICATIONS

International Search Report and the Written Opinion of the International Searching Authority, or the Declaration of PCT/US2017/031020, dated Jun. 27, 2017.

(Continued)

*Primary Examiner* — Matthew J Merkling

(57) ABSTRACT

An electrode for an energy storage device includes carbon black particles having (a) a Brunauer-Emmett-Teller (BET) surface area ranging from 70 to 120 m²/g; (b) an oil absorption number (OAN) ranging from 180 to 310 mL/100 g; (c) a surface energy less than or equal to 15 mJ/m²; and (d) either an $L_a$ crystallite size less than or equal to 29 Å, or a primary particle size less than or equal to 24 nm.

11 Claims, 6 Drawing Sheets

(51) Int. Cl.
   *H01M 10/0525* (2010.01)
   *H01M 4/02* (2006.01)

(56) References Cited

U.S. PATENT DOCUMENTS

2013/0295462 A1   11/2013   Atanassova et al.
2016/0293959 A1   10/2016   Blizanac et al.

OTHER PUBLICATIONS

Gruber et al., "Raman studies of heat-treated carbon blacks," *Carbon* vol. 32 (7), pp. 1377-1382, (1994).
Levoguer C. L. et al., "Measurement of the Surface Energies of Pharmaceutical Powders using a Novel Vapour Adsorption Method"; Dynamic Vapour Sorption—Application Note 17; *Surface Measurements Systems*; pp. 1-11.

\* cited by examiner

ELECTRODES, COMPOSITIONS, AND DEVICES HAVING HIGH STRUCTURE CARBON BLACKS

RELATED APPLICATION

This application claims priority under 35 U.S.C. § 119(e) to U.S. Prov. App. No. 62/332,142, filed May 5, 2016, hereby incorporated by reference.

FIELD OF THE INVENTION

The invention relates to electrodes, compositions, and devices including high structure carbon blacks.

BACKGROUND

Lithium-ion batteries are commonly used electrical energy sources for a variety of applications, such as electronic devices and electric vehicles. A lithium-ion battery typically includes a negative electrode (e.g., graphite) and a positive electrode (described below) that allow lithium ions and electrons to move to and from the electrodes during charging and discharging. An electrolyte solution in contact with the electrodes provides a conductive medium in which the ions can move. To prevent direct reaction between the electrodes, an ion-permeable separator is used to physically and electrically isolate the electrodes. When the battery is used as an energy source for a device, electrical contact is made to the electrodes, allowing electrons to flow through the device to provide electrical power, and lithium ions to move through the electrolyte from one electrode to the other electrode.

The positive electrode typically includes a conductive substrate supporting a mixture (e.g., applied as a paste) having at least an electroactive material, a binder, and a conductive additive. The electroactive material, such as a lithium transition metal oxide, is capable of receiving and releasing lithium ions. The binder, such as polyvinylidene fluoride, is used to provide mechanical integrity and stability to the electrode. Typically, since the electroactive material and the binder are electrically poorly conducting or insulating, the conductive additive (e.g., graphite and carbon black) is added to enhance the electrical conductivity of the electrode. The conductive additive and the binder, however, are generally not involved in electrochemical reactions that generate electrical energy, so these materials can negatively affect certain performance characteristics (e.g., capacity and energy density) of the battery since they effectively lower the amount of electroactive material that can be contained in the positive electrode.

SUMMARY

In one aspect, the invention features highly structured carbon black particles (or carbon blacks), and applications of such carbon blacks in energy storage applications, such as lithium-ion batteries. It has been found that such carbon blacks can be used in electrodes (e.g., positive electrodes of lithium-ion batteries) at relatively low loadings (i.e., concentrations). As a result, for a given electrode volume, relatively more electroactive material can be incorporated, thereby improving the battery's performance (e.g., capacity, volumetric energy, and energy density).

Furthermore, the highly structured carbon blacks described herein are capable of providing processability benefits that can enhance the process used to manufacture the electrodes. For example, the highly structured carbon blacks are easily dispersible. In the manufacturing process, less energy is needed to combine an easily dispersible carbon black in an electrode formulation, thereby enhancing the cost-effectiveness and efficiency of the process. The highly structured carbon blacks described herein are also capable of providing a formulation with relatively low viscosity. As a result, the formulation can be made with a high solids content, which means more electrodes can be formed for a given formulation batch, and utilization is increased.

In another aspect, the invention features an electrode for an energy storage device, including carbon black particles having (a) a Brunauer-Emmett-Teller (BET) surface area ranging from 70 to 120 $m^2/g$; (b) an oil absorption number (OAN) ranging from 180 to 310 mL/100 g; (c) a surface energy less than or equal to 15 $mJ/m^2$; and (d) either an $L_a$ crystallite size less than or equal to 29 Å, or a primary particle size less than or equal to 24 nm. The electrode can be included in an energy storage device, such as a lithium ion battery, a primary alkaline battery, a primary lithium battery, a nickel metal hydride battery, a sodium battery, a lithium sulfur battery, a lithium air battery, a hybrid battery-supercapacitor device, a metal-air battery, a flow battery, or a supercapacitor.

In another aspect, the invention features a composition, including carbon black particles having (a) a BET surface area ranging from 70 to 120 $m^2/g$; (b) an OAN ranging from 180 to 310 mL/100 g; (c) a surface energy less than or equal to 15 $mJ/m^2$; and (d) either an $L_a$ crystallite size less than or equal to 29 Å, or a primary particle size less than or equal to 24 nm. The composition can be in the form of a dispersion, a dry powder, a slurry or a paste. A paste that has 4 wt % conductive carbon black can have a viscosity of less than 20 Pa-s at shear rate of 50 $s^{-1}$. The composition can further include an electroactive material.

In another aspect, the invention features carbon black particles having (a) a BET surface area ranging from 70 to 120 $m^2/g$; (b) an OAN ranging from 180 to 310 mL/100 g; (c) a surface energy less than or equal to 15 $mJ/m^2$; and (d) either an $L_a$ crystallite size less than or equal to 29 Å, or a primary particle size less than or equal to 24 nm.

In another aspect, the invention features a method, including heat treating carbon black particles to form a heat-treated carbon black particles having (a) a BET surface area ranging from 70 to 120 $m^2/g$; (b) an OAN ranging from 180 to 310 mL/100 g; (c) a surface energy less than or equal to 18 $mJ/m^2$; and (d) either an $L_a$ crystallite size less than or equal to 29 Å, or a particle size less than or equal to 24 nm. The heat treating can be performed at a temperature ranging from 1400° C. to 1600° C. in an inert atmosphere.

Embodiments of one or more aspects may include one or more of the following features. The carbon black particles have both an $L_a$ crystallite size less than or equal to 29 Å, and a particle size less than or equal to 24 nm. The carbon black particles have a BET surface area ranging from 80 to 110 $m^2/g$, or from 70 to 100 $m^2/g$. The carbon black particles have an OAN number ranging from 200 to 285 mL/100 g, or from 200 to 260 mL/100 g. The carbon black particles have either an $L_a$ crystallite size less than or equal to 27 Å, or a particle size less than or equal to 22 nm. The carbon black particles have either an $L_a$ crystallite size less than or equal to 29 Å, or a particle size less than or equal to 20 nm. The carbon black particles have an $L_a$ crystallite size less than or equal to 29 Å, or less than or equal to 27 Å, or from 25 Å to 29 Å. The electrode of any one of claims 1-11, wherein the carbon black particles have a particle size less than or equal to 24 nm, or less than or equal to 22 nm, or from 12 to 24 nm. The carbon black particles have a surface energy less than or equal to 10 mJ/m$^2$, or from 1 to 10 mJ/m$^2$. The electrode carbon black particles have a % crystallinity ($I_G/I_{G+D}$) less than or equal to 45%, or 35% to 45%, as determined by Raman spectroscopy. The carbon black particles have an oxygen content of less than or equal to 1 wt %. The carbon black particles have a dispersability of less than one micron ($D_{50}$ by volume). The carbon black particles have a ratio of statistical thickness surface area to BET surface area (STSA:BET) greater than 0.95:1.

Other aspects, features, and advantages of the invention will be apparent from the description of the embodiments thereof and from the claims.

DETAILED DESCRIPTION OF THE EMBODIMENTS

Figure 1:
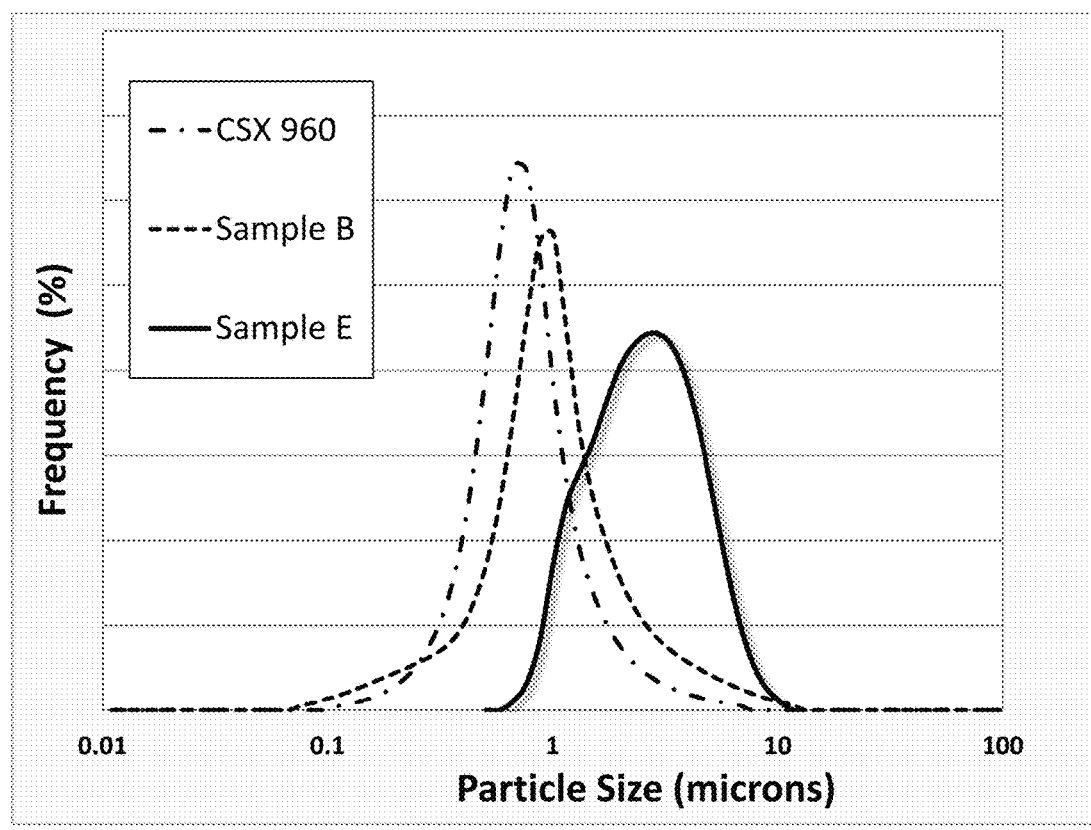
FIG. 1 is a plot of particle size distributions for formulations including 5.7 wt % carbon black (or acetylene black) and 4.3 wt % PVDF in NMP after 20 minutes of milling in an SPEX® 8000M mixer/mill, in accordance to Example 2.

Described below are high structure carbon black particles, methods of making the particles, compositions including the particles, and applications of the particles in energy storage devices (e.g., lithium-ion batteries).

The high structure carbon black particles can generally be characterized by their (1) Brunauer-Emmett-Teller (BET) total surface areas, (2) structures, and (3) sizes of the crystallites and/or sizes of the primary particles. Additionally, the particles can be further characterized by their surface energies, statistical thickness surface areas, and/or oxygen content, in any combination.

The carbon black particles have relatively low to intermediate total surface areas. Without being bound by theory, it is believed that, during use of a battery, there are chemical side reactions that can occur within the battery that degrade its performance. Having particles with lower surface areas can enhance the performance of the battery by providing fewer surface sites where these unwanted side reactions can occur. However, the surface areas of the particles should be balanced, i.e., high enough, so that the particles can sufficiently cover the electroactive material and provide the desired electrode conductivity. In some embodiments, the carbon black particles have a BET surface area ranging from 70 to 120 m$^2$/g. The BET surface area can have or include, for example, one of the following ranges: from 70 to 110 m$^2$/g, or from 70 to 100 m$^2$/g, or from 70 to 90 m$^2$/g, or from 70 to 80 m$^2$/g, or from 80 to 120 m$^2$/g, or from 80 to 110 m$^2$/g, or from 80 to 100 m$^2$/g, or from 80 or 90 m$^2$/g, or from 90 to 120 m$^2$/g, or from 90 to 110 m$^2$/g, or from 90 to 100 m$^2$/g, or from 100 to 120 m$^2$/g, or from 100 to 110 m$^2$/g, or from 110 to 120 m$^2$/g. All BET surface area values disclosed herein refer to "BET nitrogen surface area" and are determined by ASTM D6556-10, the entirety of which is incorporated herein by reference.

The carbon black particles have relatively high oil absorption numbers (OANs), which are indicative of the particles' relatively high structures, or volume-occupying properties. For a given mass, the high structure carbon blacks can occupy more volume than other carbon blacks having lower structures. When used as a conductive additive in a battery electrode, carbon blacks having relatively high OANs can provide a continuously electrically-conductive network (i.e., percolate) throughout the electrode at relatively lower loadings. Consequently, more electroactive material can be used, thereby improving the performance of the battery. In some embodiments, the carbon blacks have OANs ranging from 180 to 310 mL/100 g. The OANs can have or include, for example, one of the following ranges: from 180 to 290 mL/100 g, or from 180 to 270 mL/100 g, or from 180 to 250 mL/100 g, or from 180 to 230 mL/100 g, or from 200 to 310 mL/100 g, or from 200 to 300 mL/100 g, or from 200 to 290 mL/100 g, or from 200 to 285 mL/100 g, or from 200 to 270 mL/100 g, or from 200 to 265 mL/100 g, or from 200 to 260 mL/100 g, or from 200 to 250 mL/100 g, or from 200 to 240 mL/100 g, or from 200 to 230 mL/100 g, or from 200 to 220 mL/100 g, or from 210 to 310 mL/100 g, or from 210 to 300 mL/100 g, or from 210 to 290 mL/100 g, or from 210 to 280 mL/100 g, or from 210 to 270 mL/100 g, or from 210 to 260 mL/100 g, or from 210 to 250 mL/100 g, or from 210 to 240 mL/100 g, or from 210 to 230 mL/100 g, or from 220 to 310 mL/100 g, or from 220 to 300 mL/100 g, or from 220 to 290 mL/100 g, or from 220 to 280 mL/100 g, or from 220 to 270 mL/100 g, or from 220 to 260 mL/100 g, or from 220 to 250 mL/100 g, or from 220 to 240 mL/100 g, or from 230 to 310 mL/100 g, or from 230 to 290 mL/100 g, or from 230 to 270 mL/100 g, or from 230 to 260 mL/100 g, or from 230 to 250 mL/100 g, or from 240 to 310 mL/100 g, or from 240 to 290 mL/100 g, or from 240 to 270 mL/100 g or from 240 to 260 mL/100 g. Other ranges within these ranges are possible. All OAN values cited herein are determined by the method described in ASTM D 2414-13a, using epoxidized fatty acid ester (EFA) oil and Procedure B. The method of ASTM D 2414-13a is incorporated herein by reference.

The high structure carbon black particles generally have moderate crystalline domain sizes and/or moderate degrees of crystallinity. Without being bound by theory, it is believed that certain domain sizes and/or crystallinities can enhance the conductivity and performance of the particles by reducing the electrical resistance that can occur when electrons move between different areas or phases of material. However, domain sizes that are too big and/or crystallinities that are too high can degrade electrical conductivity since, it is believed, other conducting mechanisms (e.g., holes) can be affected.

The crystalline domains can be characterized by an $L_a$ crystallite size, as determined by Raman spectroscopy. $L_a$ is defined as 43.5×(area of G band/area of D band). The crystallite size can give an indication of the degree of graphitization, where a higher $L_a$ value correlates with a higher degree of graphitization. Raman measurements of $L_a$ were based on Gruber et al., "Raman studies of heat-treated carbon blacks," *Carbon* Vol. 32 (7), pp. 1377-1382, 1994, which is incorporated herein by reference. The Raman spectrum of carbon includes two major "resonance" bands at about 1340 cm$^{-1}$ and 1580 cm$^{-1}$, denoted as the "D" and "G" bands, respectively. It is generally considered that the D band is attributed to disordered sp$^2$ carbon, and the G band to graphitic or "ordered' sp$^2$ carbon. Using an empirical approach, the ratio of the G/D bands and an $L_a$ measured by X-ray diffraction (XRD) are highly correlated, and regression analysis gives the empirical relationship:

$$L_a = 43.5 \times (\text{area of } G \text{ band/area of } D \text{ band}),$$

in which $L_a$ is calculated in Angstroms. Thus, a higher $L_a$ value corresponds to a more ordered crystalline structure.

In some embodiments, the carbon black has an $L_a$ crystallite size of less than or equal to 35 Å, for example, from 25 Å to 35 Å. The $L_a$ crystallite size can have or include, for example, one of the following ranges: from 25 to 33 Å, or from 25 to 31 Å, or from 25 to 29 Å, or from 25 to 27 Å, or from 27 to 35 Å, or from 27 to 33 Å, or from 27 to 31 Å, or from 27 to 29 Å, or from 29 to 35 Å, or from 29 to 33 Å, or from 29 to 31 Å, or from 31 to 35 Å, or from 31 to 33 Å, or from 33 to 35 Å. In certain embodiments, the $L_a$ crystallite size can be less than or equal to 33 Å, or less than or equal to 31 Å, or less than or equal to 29 Å, or less than or equal to 27 Å.

The crystalline domains can be characterized by an $L_c$ crystallite size. The $L_c$ crystallite size was determined by X-ray diffraction using an X-ray diffractometer (PANalytical X'Pert Pro, PANalytical B.V.), with a copper tube, tube voltage of 45 kV, and a tube current of 40 mA. A sample of carbon black particles was packed into a sample holder (an accessory of the diffractometer), and measurement was performed over angle (2θ) range of 10° to 80°, at a speed of 0.14°/min. Peak positions and full width at half maximum values were calculated by means of the software of the diffractometer. For measuring-angle calibration, lanthanum hexaboride (LaB$_6$) was used as an X-ray standard. From the measurements obtained, the $L_c$ crystallite size was determined using the Scherrer equation: $L_c (\text{Å}) = K^*\lambda/(\beta^*\cos\theta)$, where K is the shape factor constant (0.9); λ is the wavelength of the characteristic X-ray line of Cu K$_{\alpha 1}$ (1.54056 Å); β is the peak width at half maximum in radians; and θ is determined by taking half of the measuring angle peak position (2θ).

A higher $L_c$ value corresponds to a more ordered crystalline structure. In some embodiments, the carbon black has an $L_c$ crystallite size of less than or equal to 27 Å, for example, from 15 Å to 27 Å. The $L_c$ crystallite size can have or include, for example, one of the following ranges: from 15 to 25 Å, or from 15 to 23 Å, or from 15 to 21 Å, or from 15 to 19 Å, or from 15 to 17 Å, or from 17 to 27 Å, or from 17 to 25 Å, or from 17 to 23 Å, or from 17 to 21 Å, or from 17 to 19 Å, or from 19 to 27 Å, or from 19 to 25 Å, or from 19 to 23 Å, or from 19 to 21 Å, or from 21 to 27 Å, or from 21 to 25 Å, or from 21 to 23 Å, or from 23 to 27 Å, or from 23 to 25 Å, or from 25 to 27 Å. In certain embodiments, the $L_c$ crystallite size can be less than or equal to 25 Å, or less than or equal to 23 Å, or less than or equal to 21 Å, or less than or equal to 19 Å, or less than or equal to 17 Å.

The carbon black particles can be described (in a simplified manner) as an aggregate of a number of smaller particles, which are referred to as "primary particles." The carbon black aggregates can be, for example, assemblies of primary carbon black particles that are fused at the contact points and cannot readily be separated by shearing. The size of primary particles in a carbon black particle can vary. The number of primary particles in the aggregate can also vary, for example, from few to tens, or possibly hundreds. The number of primary particles and the arrangement of them in the carbon black aggregate not only dictate the size of the carbon black aggregate but also the structure of the carbon black. Without being bound by theory, it is believed that, for a given mass of particles, those particles with small average primary particle sizes can more effectively cover the electroactive material because the particles have a large number of contact points, thereby enhancing the performance of the particles. The average primary particle size ($P_{size}$) can be, for example, less than 24 nm, for example, from 12 to 24 nm. The average primary particle size can have or include, for example, one of the following ranges: from 12 nm to 22 nm, or from 12 nm to 20 nm, or from 12 nm to 18 nm, or from 12 nm to 16 nm, or from 14 nm to 24 nm, or from 14 nm to 22 nm, or from 14 nm to 20 nm, or from 14 nm to 18 nm, or from 16 nm to 24 nm, or from 16 nm to 22 nm, or from 16 nm to 20 nm, or from 18 nm to 24 nm, or from 18 nm to 22 nm, or from 20 nm to 24 nm. In certain embodiments, the average primary particle size is less than or equal to 22 nm, or less than or equal to 19 nm, or less than or equal to 17 nm, or less than or equal to 15 nm, or less than or equal to 13 nm. The average primary particle size is determined by ASTM D3849-14a, the entirety of which is incorporated herein by reference.

Independent of the properties described above, the carbon black particles can have one or more of the following additional properties: statistical thickness surface area (STSA), STSA to BET surface area ratio, % crystallinity, surface energy, and/or oxygen content. For instance, the carbon black particles can have at least one, two, three, four, or more of the following properties. The carbon black particles can have any combination of the following properties.

The carbon black particles can have statistical thickness surface areas (STSAs) that are substantially the same as the BET total surface areas described above, which indicate that the particles are substantially not porous. Without being bound by theory, it is believed that pores create tortuous paths within the particles that can impede the flow of ions (e.g., lithium ions), particularly at a low state of charge and/or at high discharge rates. Additionally, a higher degree of porosity can create higher total surface areas, which, as described above, can lead to more unwanted chemical side reactions. In some embodiments, the carbon black particles have a ratio of STSA to BET surface area (STSA:BET ratio) greater than 0.95:1, e.g., greater than 0.96:1, or greater than 0.97:1, or greater than 0.98:1, or greater than 0.99:1. Statistical thickness surface area is determined by ASTM D6556-10.

The carbon black particles can have a high degree of graphitization, as indicated by a high % crystallinity, which is obtained from Raman measurements as a ratio of the area of the G band and the areas of G and D bands ($I_G/I_{G+D}$). In certain embodiments, the carbon black particles have % crystallinities ($I_G/I_{G+D}$) ranging from 35% to 45%, as determined by Raman spectroscopy. The % crystallinity ($I_G/I_{G+D}$) can have or include, for example, one of the following ranges: from 35% to 43%, or from 35% to 41%, or from 35% to 39%, or from 37% to 45%, or from 37% to 43%, or from 37% to 41%, from 39% to 45%, or from 39% to 43%, or from 41% to 45%.

A high degree of graphitization can also be indicated by lower surface energy values, which can be associated with lower amounts of residual impurities on the surface of carbon black particles, and thus, their hydrophobicity. Without being bound by theory, it is believed that, up to a threshold purity level, purer particles can provide improved electrical conductivity, thereby improving the performance of the particles. Surface energy can be measured by Dynamic Water (Vapor) Sorption (DVS) or water spreading pressure (described below). In some embodiments, the carbon black has a surface energy (SE) less than or equal to 15 mJ/m², e.g., from the detection limit (about 2 mJ/m²) to 15 mJ/m². The surface energy can have or include, for example, one of the following ranges: from the detection limit to 12 mJ/m², or from the detection limit to 10 mJ/m², or from the detection limit to 8 mJ/m², or from the detection limit to 6 mJ/m², or from the detection limit to 4 mJ/m². In certain embodiments, the surface energy, as measured by DVS, is less than 14 mJ/m², or less than 12 mJ/m², or less than 10 mJ/m², or less than 8 mJ/m², or less than 6 mJ/m², or less than 4 mJ/m², or at the detection limit.

Water spreading pressure is a measure of the interaction energy between the surface of carbon black (which absorbs no water) and water vapor. The spreading pressure is measured by observing the mass increase of a sample as it adsorbs water from a controlled atmosphere. In the test, the relative humidity (RH) of the atmosphere around the sample is increased from 0% (pure nitrogen) to about 100% (water-saturated nitrogen). If the sample and atmosphere are always in equilibrium, the water spreading pressure ($\pi_e$) of the sample is defined as:

$$\pi_e = \frac{RT}{A} \int_o^{P_o} \Gamma d\ln P$$

where R is the gas constant, T is the temperature, A is the BET surface area of the sample as described herein, $\Gamma$ is the amount of adsorbed water on the sample (converted to moles/gm), P is the partial pressure of water in the atmosphere, and $P_o$ is the saturation vapor pressure in the atmosphere. In practice, the equilibrium adsorption of water on the surface is measured at one or (preferably) several discrete partial pressures and the integral is estimated by the area under the curve.

The procedure for measuring the water spreading pressure is detailed in "Dynamic Vapor Sorption Using Water, Standard Operating Procedure", rev. Feb. 8, 2005 (incorporated in its entirety by reference herein), and is summarized here. Before analysis, 100 mg of the carbon black to be analyzed was dried in an oven at 125° C. for 30 minutes. After ensuring that the incubator in the Surface Measurement Systems DVS1 instrument (supplied by SMS Instruments, Monarch Beach, Calif.) had been stable at 25° C. for 2 hours, sample cups were loaded in both the sample and reference chambers. The target RH was set to 0% for 10 minutes to dry the cups and to establish a stable mass baseline. After discharging static and taring the balance, approximately 10-12 mg of carbon black was added to the cup in the sample chamber. After sealing the sample chamber, the sample was allowed to equilibrate at 0% RH. After equilibration, the initial mass of the sample was recorded. The relative humidity of the nitrogen atmosphere was then increased sequentially to levels of approximately 0, 5, 10, 20, 30, 40, 50, 60, 70, 80, 90, and 95% RH, with the system allowed to equilibrate for 20 minutes at each RH level. The mass of water adsorbed at each humidity level was recorded, from which water spreading pressure was calculated (see above). The measurement was done twice on two separate samples and the average value is reported.

The carbon black particles can have a relatively low oxygen content, which can be indicative of the particles' purity and electrical conductivity properties. In some embodiments, the carbon black has an oxygen content of less than or equal to 1 wt %, or less than or equal to 0.8 wt %, or less than or equal to 0.6 wt %%, or less than or equal to 0.4 wt %. The oxygen content can have or include, for example, one of the following ranges: from 0.01 to 1 wt %, or from 0.03 to 1 wt %, or from 0.03 to 0.8 wt %, or from 0.03 to 0.6 wt % or from 0.03 to 0.4 wt %. The oxygen content can be determined by inert gas fusion in which a sample of carbon black particles are exposed to very high temperatures (e.g., about 3000° C.) under inert gas conditions. The oxygen in the sample reacts with carbon to form CO and $CO_2$, which can be monitored by a non-dispersive infrared technique. The total oxygen content is reported in weight percent relative to the total weight of the sample. Various oxygen analyzers based on the inert gas fusion methods are known in the art and commercially available, for example a LECO® TCH600 analyzer.

The high structure carbon black particles can be produced by heat treating starting or "base" carbon black particles. The base carbon black particles are available from Cabot Corporation (Billerica, Mass.) under the name CSX-960. Other base carbon black particles and methods of making them are described in U.S. Provisional Patent Application No. 62/500,672, entitled "Carbon Black and Rubber Compounds Incorporating Same", filed on May 3, 2017, hereby incorporated by reference.

As indicated above, in certain embodiments, the high structure carbon black particles are heat-treated carbon black particles. "Heat-treated carbon black particles" are carbon black particles that have undergone a "heat treatment," which as used herein, generally refers to a post-treatment of base carbon black particles that had been previously formed, e.g., by a furnace black process. The heat treatment can occur under inert conditions (i.e., in an atmosphere substantially devoid of oxygen), and typically occurs in a vessel other than that in which the base carbon black particles were formed. Inert conditions include, but are not limited to, a vacuum, and an atmosphere of inert gas, such as nitrogen, argon, and the like. In some embodiments, the heat treatment of carbon blacks under inert conditions is capable of reducing the number of impurities (e.g., residual oil and salts), defects, dislocations, and/or discontinuities in carbon black crystallites and/or increase the degree of graphitization.

The heat treatment temperatures can vary. In various embodiments, the heat treatment (e.g., under inert conditions) is performed at a temperature of at least 1000° C., or at least 1200° C., or at least 1400° C., or at least 1500° C., or at least 1700° C., or at least 2000° C. In some embodiments, the heat treatment is performed at a temperature ranging from 1000° C. to 2500° C., e.g., from 1400° C. to 1600° C. Heat treatment performed at a temperature refers to one or more temperatures ranges disclosed herein, and can involve heating at a steady temperature, or heating while ramping the temperature up or down, either stepwise and/or otherwise.

The heat treatment time periods can vary. In certain embodiments, the heat treatment is performed for at least 15 minutes, e.g., at least 30 minutes, or at least 1 hour, or at least 2 hours, or at least 6 hours, or at least 24 hours, or any of these time periods up to 48 hours, at one or more of the temperature ranges disclosed herein. In some embodiments, the heat treatment is performed for a time period ranging from 15 minutes to at least 24 hours, e.g., from 15 minutes to 6 hours, or from 15 minutes to 4 hours, or from 30 minutes to 6 hours, or from 30 minutes to 4 hours.

Generally, the heat treatment is performed until one or more desired properties of the high structure carbon black particles (e.g., surface energy, $L_a$ crystallite size, $L_c$ crystallite size, and/or % crystallinity) are produced. As an example, during initial periods of heat treatment, test samples of heat treated particles can be removed, and their $L_c$ crystallite sizes can be measured. If the measured $L_c$ crystallite sizes are not as desired, then various heat treatment process parameters (such as heat treatment temperature and/or residence time) can be adjusted until the desired $L_c$ crystallite size is produced.

The high structure carbon black particles can be used in a variety of energy storage devices, such as lithium-ion batteries. As an example, the carbon black particles can be used in a cathode composition for a lithium-ion battery. The cathode composition typically includes a mixture of one or more electroactive materials, a binder, and a conductive aid (such as the high structure carbon blacks). As used herein, an "electroactive material" means a material capable of undergoing reversible, Faradaic and/or capacitive electrochemical reactions.

In some embodiments, the electroactive material is a lithium ion-based compound. Exemplary electroactive materials include those selected from at least one of:

$LiMPO_4$, wherein M represents one or more metals selected from Fe, Mn, Co, and Ni;
$LiM'O_2$, wherein M' represents one or more metals selected from Ni, Mn, Co, Al, Mg, Ti, V, Cr, Fe, Zr, Ga, and Si;
$Li(M'')_2O_4$, wherein M'' represents one or more metals selected from Ni, Mn, Co, Al, Mg, Ti, V, Cr, Fe, Zr, Ga, and Si (e.g., $Li[Mn(M'')]_2O_4$); and
$Li_{1+x}(Ni_yCo_{1-y-z}Mn_z)_{1-x}O_2$, wherein x ranges from 0 to 1, y ranges from 0 to 1 and z ranges from 0 to 1.

In certain embodiments, the electroactive material is selected from at least one of $LiNiO_2$; $LiNi_xAl_yO_2$ where x varies from 0.8-0.99, y varies from 0.01-0.2, and x+y=1; $LiCoO_2$; $LiMn_2O_4$; $Li_2MnO_3$; $LiNi_{0.5}Mn_{1.5}O_4$; $LiFe_xMn_y$-$Co_zPO_4$ where x varies from 0.01-1, y varies from 0.01-1, z varies from 0.01-0.2, and x+y+z=1; and $LiNi_{1-x-y}Mn_xCo_yO_2$, wherein x ranges from 0.01 to 0.99 and y ranges from 0.01 to 0.99.

In other embodiments, the electroactive material is selected from at least one of $Li_2MnO_3$; $LiNi_{1-x-y}Mn_xCo_yO_2$ wherein x ranges from 0.01 to 0.99 and y ranges from 0.01 to 0.99; $LiNi_{0.5}Mn_{1.5}O_4$; $Li_{1+x}(Ni_yCo_{1-y-z}Mn_z)_{1-x}O_2$, wherein x ranges from 0 to 1, y ranges from 0 to 1 and z ranges from 0 to 1; and layer-layer compositions containing at least one of an $Li_2MnO_3$ phase and an $LiMn_2O_3$ phase.

In some embodiments, the electrode includes a mixture of active materials having a nickel-doped Mn spinel, and a layer-layer Mn rich composition. The nickel-doped Mn spinel can have the formula $LiNi_{0.5}Mn_{1.5}O_4$, and the layer-layer Mn rich composition can contain a $Li_2MnO_3$ or a $LiMn_2O_3$ phase, and mixtures thereof.

The concentration of electroactive material(s) in the electrode can vary, depending on the particular type of energy storage device. In some embodiments, the electroactive material is present in the cathode composition in an amount of at least 80% by weight, relative to the total weight of the composition, e.g., an amount of at least 90%, or an amount ranging from 80% to 99%, or an amount ranging from 90% to 99% by weight, relative to the total weight of the composition. The electroactive material is typically in the form of particles. In some embodiments, the electroactive particles have a $D_{50}$ (or median) particle size distribution ranging from 100 nm to 30 μm, e.g., a $D_{50}$ ranging from 1-15 μm. In other embodiments, the electroactive particles have a $D_{50}$ ranging from 1-6 μm, e.g., from 1-5 μm.

Typically, the cathode composition further includes one or more binders to enhance the mechanical properties of the formed electrode. Exemplary binder materials include, but are not limited to, fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders, such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. Other possible binders include polyethylene, polypropylene, ethylene-propylene-diene terpolymer (EPDM), sulfonated EPDM, styrene-butadiene rubber (SBR), and fluoro rubber and copolymers and mixtures thereof. In some embodiments, the binder is present in the cathode composition in an amount of 1 to 10% by weight.

Like the concentrations of the electroactive material, the concentrations of the high structure carbon black particles can vary. For example, for batteries used in electric vehicles, the carbon black amount can range from 1-2% by weight. For batteries used in plug-in vehicles, the carbon black amount can range from 3-6% by weight. For batteries used in hybrid vehicles, the carbon black amount can range from 5-10% by weight.

An electrode (e.g., cathode) composition can be made by homogeneously interspersing (e.g., by uniformly mixing) the high structure carbon black particles with the electroactive material. In some embodiments, the binder is also homogeneously interspersed with the carbon black particles and electroactive material. The electrode composition can take the form of a paste or a slurry, in which particulate electroactive material, carbon black, and binder (if present) are combined in the presence of one or more solvents. Exemplary solvents include, e.g., N-methylpyrrolidone (NMP), acetone, alcohols, and water. The components of the electrode composition can be combined in the solvent in any order so long as the resulting mixture is substantially homogeneous, which can be achieved by shaking, stirring, etc. In certain embodiments, the electrode composition is a solid resulting from solvent removal from the paste or slurry.

It has been found that the high structure carbon black particles are capable of providing processability benefits. For example, the high structure particles are capable of providing good dispersability, which enhances the uniform distribution of fine particles in the composition. "Dispersability," as used herein, is defined as the particle size (or $D_{50}$, by volume) achieved in a composition having of 5.7 wt % carbon black and 4.3 wt % PVDF (Kynar® HSV 900 polyvinylidene fluoride-based resin with molecular weight of 900,000, from Arkema) in NMP after 20 minutes of milling in a SPEX® 8000M mixer/mill. In some embodiments, the high structure carbon black particles have a dispersability of about one micron.

Surprisingly, the high structure carbon black particles are also capable of providing a paste having relatively low viscosity (or at least, similar to conductive carbons currently used by the industry). This capability is rather unexpected since highly structured additives typically lead to formulations with high viscosity. Having a paste with low viscosity allows easier interspersion, more compositional uniformity, higher concentrations (i.e., higher amounts of active materials), manufacturing flexibility, and lower costs (e.g., due to lower processing energy needed). Viscosity, as used herein, is defined as the viscosity at a shear rate of 50 s$^1$ for a paste having NCM 111:carbon black:PVDF binder=93:4:3 in NMP at 68 wt % solids prepared by milling in a SPEX® 8000M mixer/mill for 30 minutes. "NCM 111" is a lithium nickel cobalt manganese oxide (Ni:Co:Mn=1:1:1) battery electroactive material from TODA Kogyo Corp. (NME-1100). In some embodiments, the high structure carbon black particles can provide a paste having a viscosity of less than 20 Pa-s, for example, less than 18 Pa-s, or less than 16 Pa-s.

In some embodiments, an electrode is formed by depositing the paste onto an electrically conducting substrate (e.g., an aluminum current collector), followed by removing the solvent. In certain embodiments, the paste has a sufficiently high solids loading to enable deposition onto the substrate while minimizing the formation of inherent defects (e.g., cracking) that may result with a less viscous paste (e.g., having a lower solids loading). Moreover, a higher solids loading reduces the amount of solvent needed. The solvent is removed by drying the paste, either at ambient temperature or under low heat conditions, e.g., temperatures ranging from 20° to 100° C. The deposited cathode/current collector can be cut to the desired dimensions, optionally followed by calendaring.

The formed electrode can be incorporated into a lithium-ion battery according to methods known in the art, for example, as described in "Lithium Ion Batteries Fundamentals and Applications", by Yuping Wu, CRC press, (2015).

In other embodiments, the high structure carbon black particles are used (e.g., incorporated) in electrodes of other energy storage devices, such as, primary alkaline batteries, primary lithium batteries, nickel metal hydride batteries, sodium batteries, lithium sulfur batteries, lithium air batteries, and supercapacitors. Methods of making such devices are known in the art and are described, for example, in "Battery Reference Book", by TR Crompton, Newness (2000).

EXAMPLES

Example 1

This example describes the preparation of a highly structured carbon black by heat treating a base carbon black. The base carbon black was a furnace carbon black (CSX-960 from Cabot Corporation) that had BET surface area (BET SA) of 99 m$^2$/g, an oil absorption number (OAN) of 252 ml/100 g, a surface energy (SEP) of 16 mJ/m$^2$, an $L_a$ crystallite size of 15 Å, a crystallinity of about 26%, and an $L_c$ crystallite size of about 15 Å. The base carbon black was heat treated at several temperatures ranging from 1300° C. to 1600° C. in a box oven under an inert nitrogen atmosphere for 2 hours. The material was then ground with a lab mill (Perten 3710) to a tap density of about 100 g/L.

Table 1 summarizes the physical characteristics for the base carbon black (CSX-960) and the heat treated samples (Samples A-D). With the heat treatment, there were minor changes to the particle morphology as indicated by BET surface area and OAN. However, the size of the carbon crystallite domains ($L_a$ and $L_c$), particle crystallinity and surface energy changed significantly. The heat treated carbon blacks have, what is believed to be, a novel combination of intermediate surface area, high particle structure, moderate size of the crystallites, and intermediate size of the primary particles. Surprisingly, as illustrated by the following examples, carbon blacks with these morphological and physical characteristics demonstrated not only significant performance improvements to lithium-ion batteries including such carbon blacks but also maintain excellent processability properties, for instance, the ease of dispersion and low paste viscosity, which are significant for the battery manufacturers since they are able to use such high structure conductive carbon black with the same manufacturing process without significant process adjustments or upgrades.

TABLE 1

Physical characteristics of carbon blacks obtained after heat treatment

| Sample | Oven Temperature, (° C.) | BET SA (m$^2$/g) | OAN (ml/100 g) | SEP (mJ/m$^2$) | $L_a$ (Å) | Crystallinity (%) | $L_c$ (Å) |
|---|---|---|---|---|---|---|---|
| Base | n/a | 99 | 252 | 16 | 15 | 25.9 | 14.9 |
| A | 1300 | 96.4 | 244 | ≤3 | 24.6 | 36.2 | 18 |
| B | 1400 | 95.3 | 247 | ≤3 | 27.1 | 38.4 | 19.5 |
| C | 1500 | 94.3 | 246 | ≤3 | 31 | 41.6 | 22.7 |
| D | 1600 | 94.5 | 244 | ≤3 | 33 | 43 | 25.4 |

Example 2

This Example describes dispersability testing of two conductive carbon blacks (CB) and an acetylene black (AB), namely, the CSX-960 base carbon from Example 1, Sample B from Example 1, and a commercially available acetylene black (Sample E). Characteristics for these carbons are shown in Table 2. For Sample E, characteristics designated with an asterisk "*" are from public sources, such as, "Acetylene Black as Conductive Additive for Lithium-ion Batteries—Approach for Battery Conductive Additives at Denka", Advanced Technology Workshop, The Carbon Society of Japan, Kyoto, Japan 2015.06.05. A solution was prepared containing 10 wt % Kynar® HSV 900 polyvinylidene fluoride-based resin (PVDF, by Arkema with molecular weight of 900,000) in N-Methyl-2-pyrrolidone (NMP, Sigma Aldrich >99% HPLC grade). A dispersion was prepared by combining 2.29 g of a carbon black (or acetylene black), 17.1 g of the 10 wt % PVDF solution in NMP, and 20.61 g of NMP in 55 mL tungsten carbide grinding vial along with two 11.2-mm-diameter tungsten carbide balls. The tungsten carbide grinding vial and balls are available from SPEX® SamplePrep (part #8004). The dispersion was milled in a SPEX® 8000M mixer/mill for 20 minutes. Once the milling was completed, a small amount of dispersion was taken and diluted with NMP in 1:10 wt % ratio. Particle size measurements were performed using a Horiba LA-950V2 Particle Size Analyzer and its software.

TABLE 2

Characteristics of conductive carbons subjected to dispersability testing

| Sample | Type | BET SA ($m^2/g$) | OAN (ml/100 g) | SEP (mJ/$m^2$) | $L_a$ (Å) | Crystallinity (%) | $L_c$ (Å) | $P_{size}$ (nm) |
|---|---|---|---|---|---|---|---|---|
| Base | CB | 99 | 252 | 16 | 15 | 25.9 | 14.9 | 18 |
| B | CB | 95.3 | 247 | ≤3 | 27.1 | 38.4 | 19.5 | 18 |
| E | AB | 66 | 220* | 2 | 38 | 46.7 | 35* | 35* |

FIG. 1 depicts the particle size distribution of the conductive carbons prepared as described above, and Table 3 summarizes the dispersability ($D_{50}$ by volume for each carbon. As shown by the lower particle size distributions, for the given milling conditions, both the base carbon and Sample B showed better dispersability versus the comparative commercial carbon additive.

TABLE 3

Results of material dispersability and paste viscosity testing

| Sample | Dispersability (μm) | Paste viscosity (Pa · s) |
|---|---|---|
| Base | 0.67 | 9.4 |
| B | 0.9 | 17.5 |
| E | 2.6 | 18.25 |

Example 3

This Example describes a method for preparing pastes including an electroactive material and a conductive carbon additive from Example 2, and summarizes the viscosities of the resulting pastes.

A solution containing 10 wt % Kynar® HSV 900 polyvinylidene fluoride-based resin (PVDF, by Arkema with molecular weight of 900,000) in N-methyl-2-pyrrolidone (NMP, Sigma Aldrich >99% HPLC grade) was prepared. A mixture was then prepared by combining 1.09 g of a conductive carbon additive, 8.2 g of the 10 wt % PVDF solution in NMP, 25.29 g lithium nickel cobalt manganese oxide ("NCM 111", i.e., Ni:Co:Mn=1:1:1, a battery active material from TODA Kogyo Corp. (NME-1100)), and 5.42 g of NMP in a 55 mL tungsten carbide grinding vial along with two 11.2-mm diameter tungsten carbide balls. The mixture was milled in a SPEX® 8000M mixer/mill for 30 minutes to prepare a paste. Once the milling was completed, approximately 2-3 mL of the paste was used to perform rheological characterization using an AR-2000 rheometer (TA Instruments). Paste viscosity was measured at a shear rate of 50 $s^{-1}$.

Table 3 summarizes the paste viscosity for each carbon additive. As shown, the base carbon and Sample B had lower or slightly lower paste viscosities versus the comparative commercial carbon additive. The results of this viscosity and dispensability evaluation suggest that the conductive carbons described herein can be readily used with existing manufacturing process without significant adjustments.

Example 4

This Example describes a process of making a cathode including various conductive carbon additives (CCA), and the results of an evaluation of electrode sheet resistance for various compositions.

Coin-Cell Preparation:

Electrodes were prepared by mixing a slurry of 10 wt % Kynar® HSV 900 polyvinylidene fluoride-based resin (PVDF, by Arkema with molecular weight of 900,000) in N-methyl-2-pyrrolidone (NMP, Sigma Aldrich >99% HPLC grade), carbon black (CB), active material (NCM 111, approximately 7 microns $D_{50}$ particle size) and NMP. The slurries were mixed for 30 minutes with a SPEX® 8000M mixer/mill and two tungsten carbide media balls. Formulations, coated weight, and total solids loadings of the slurries are reported in Table 4:

TABLE 4

Slurry formulations tested

| Formulation NCM 111:CB:PVDF | Slurry total % solids | Coated density mg/$cm^2$ |
|---|---|---|
| 96.5:2:1.5 | 70 | 10 |
| 93:4:3 | 68 | 10 |

The electrode slurries were coated on aluminum foils using an automated doctor blade coater (Model MSK-AFA-III from MTI Corp.). The NMP was evaporated for 20 minutes in a convection oven set at 80° C. Fifteen-millimeter-in-diameter discs were punched for coin-cell preparation and dried at 110° C. under vacuum for a minimum of 4 hours. Discs were calendered at 2.5 g/cc with a manual roll press, and assembled into 2032 coin-cells in an argon-filled glove box (M-Braun) for testing against lithium foil. Glass fiber micro filters (Whatman GF/A) were used as separators. The electrolyte was 100 microliters of ethylene carbonate-dimethyl carbonate-ethylmethyl carbonate (EC-DMC-EMC), vinylene carbonate (VC) 1%, $LiPF_6$ 1M (BASF). Four coin-cells were assembled for each formulation tested. Reported capacities are averages of the four coin-cells, normalized in mAh/g of active cathode mass. Additionally, thicker electrodes (coated density=30 mg/$cm^2$) with NCM (111):CB:PVDF=96.5:2:1.5 were prepared to evaluate electrical properties and fast charging capability characteristics of the cells containing the electrodes. These electrode were calendered at 3 g/cc. The protocol for assembly into 2032 coin-cell was identical to described above.

Electrode Sheet Resistance Measurements:

Sheet resistance of coated electrodes was measured with a Lucas Lab 302 four-probe stand and an SP4 probe head connected to the rear of a Keithley 2410-C source meter. Measurements were performed in a two-wire configuration mode because it was found that four-wire measurements led to a strong contribution of substrate conductivity. The reported values are direct ohm readings from the instrument, at a current of 0.1 mA, and a cathode calendered density of 2.5 g/cc.

Electrode Through Plane (Bulk) Conductivity Measurements:

Bulk conductivity for 15-mm-diameter electrode discs coated on aluminum was measured with a drop gauge (Sylvac, 0.001 mm precision) in which DC resistance was measured between an aluminum current collector pressed against a stand (insulated from the gauge), and a contact made on the top of the electrode coating with a 0.4-$cm^2$-cylindrical carbide tip (Carbide probes Inc.) applied at 10 psi (300 g weight) against the sample. The resistivity of electrode between tip and base was measured with a Keithley 2410-C Source Meter. Bulk conductivity (S/cm) of the samples was calculated by the formula S/cm=(1/R)*(1/s)

where l is the electrode thickness minus current collector (in cm) and s is the contact area (0.4 cm$^2$).

Figure 2:
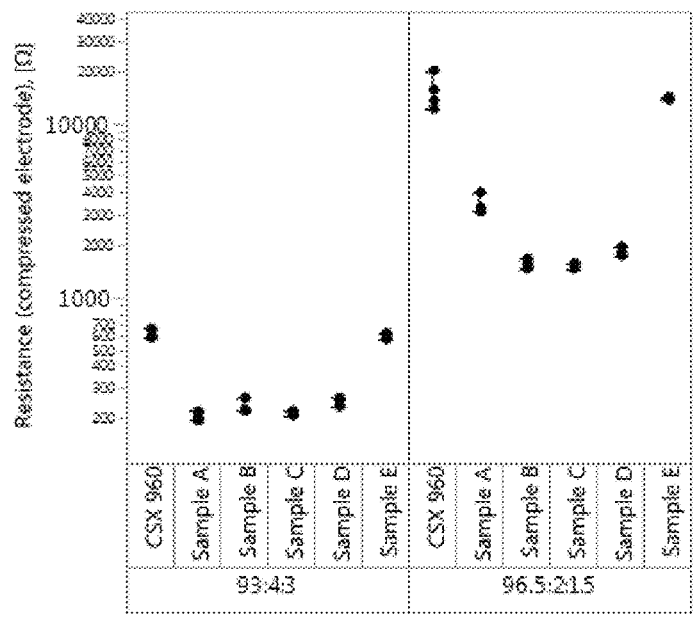
FIG. 2 is a plot showing sheet resistance for electrodes, compressed to a density of 2.5 g/cm$^3$ prior to measurement, having various conductive carbon additives at 4 wt % (left) and 2 wt % (right) loading.

As shown in FIG. 2, the heat treatment of the base CSX-960 carbon made a positive impact on the electrode resistivity. The electrodes having Sample B, C and D showed the lowest resistivity at 2 wt % carbon additive loading (about 2000 Ohm), and demonstrated substantial improvement versus the commercial additive (Sample E). At 4 wt % carbon additive loading, all heat treated samples derived from the base carbon showed a resistivity of about 200-250 Ohm, which was significantly better than the resistivities for the base black and the commercial additive Sample E (generally in 550-700 Ohm range).

As shown from the bulk conductivity measurements (Table 5 below), Sample B showed consistently better electrical (volume) conductivity in both "thin" (10 mg/cm$^2$) and "thick" (30 mg/cm$^2$) electrodes. Once again, there was a significant enhancement in the electrical conductivity of CSX-960 after heat treatment. Sample B was about 4 times more conductive than commercially used acetylene black (Sample E) in the "thin" electrodes and about 2 times more conductive in the "thick" electrodes at the same loading and calendaring density

TABLE 5

Bulk conductivity results

| Sample | Formulation NCM:CB:PVDF | Area loading mg/cm$^2$ | Calendering density g/cc | Bulk conductivity S/cm |
|---|---|---|---|---|
| CSX-960 | 93:4:3 | 10 | 2.5 | 4.62 * 10$^{-4}$ |
| Carbon B | 93:4:3 | 10 | 2.5 | 1.91 * 10$^{-3}$ |
| Carbon E | 93:4:3 | 10 | 2.5 | 4.79 * 10$^{-4}$ |
| Carbon B | 96.5:2:1.5 | 30 | 3.0 | 6.50 * 10$^{-4}$ |
| Carbon E | 96.5:2:1.5 | 30 | 3.0 | 3.55 * 10$^{-4}$ |

Example 5

This Example summarizes the evaluation results from testing various conductive carbon additives in lithium-ion coin cells.

C-Rate Capability Measurements:

Coin cells were tested on a Maccor Series 4000 battery cycler according to the following procedure: Two C/5 charge-discharge formation cycles in a 2.8-4.3 voltage window, with constant voltage charging step up to C/20, then C/2 charging with constant voltage charging step up to C/20 and C/5, C/2, 1C, 2C, 3C, 4C, 5C, 7C, 10C, 15C, and 20C discharge rates. 1C rate (h$^{-1}$) is defined as the current to discharge the cell in 1 hr. Typically, four individual coin cells were assembled and tested for each conductive carbon additive loading. The evaluation results were averaged.

Figure 3:
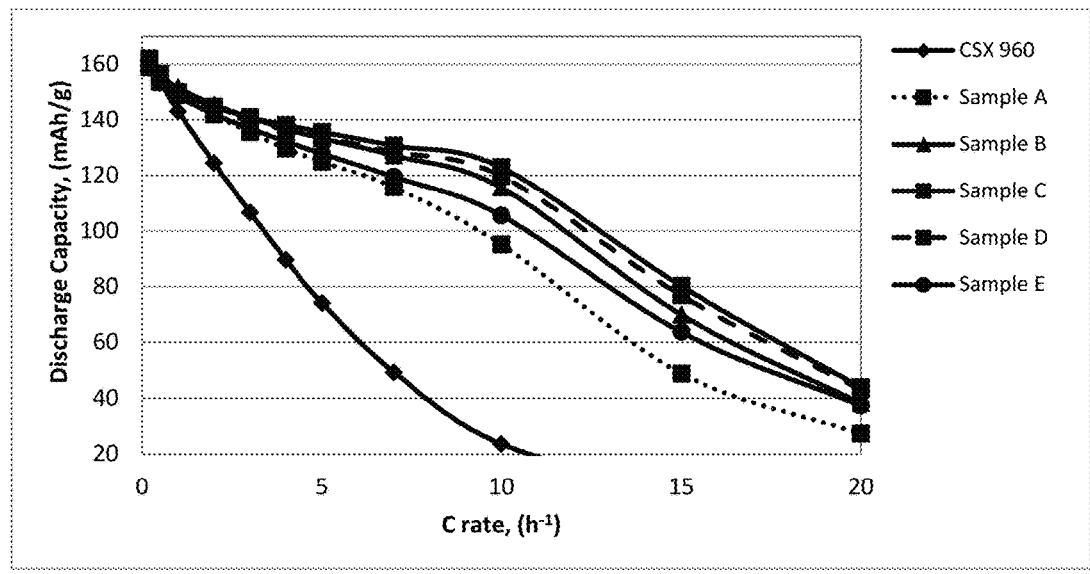
FIG. 3 shows discharge curves of for coin cells with various conductive carbon additives (CCA) at 2 wt % loading as a function of C-rate. The cathode composition was NCM 111:CCA:PVDF=96.5:2:1.5.

FIG. 3 shows discharge curves of for coin cells with various conductive carbon additives (CCA) at 2 wt % loading as a function of C-rate. The cathode composition is NCM 111:CCA:PVDF=96.5:2:1.5.

Figure 4:
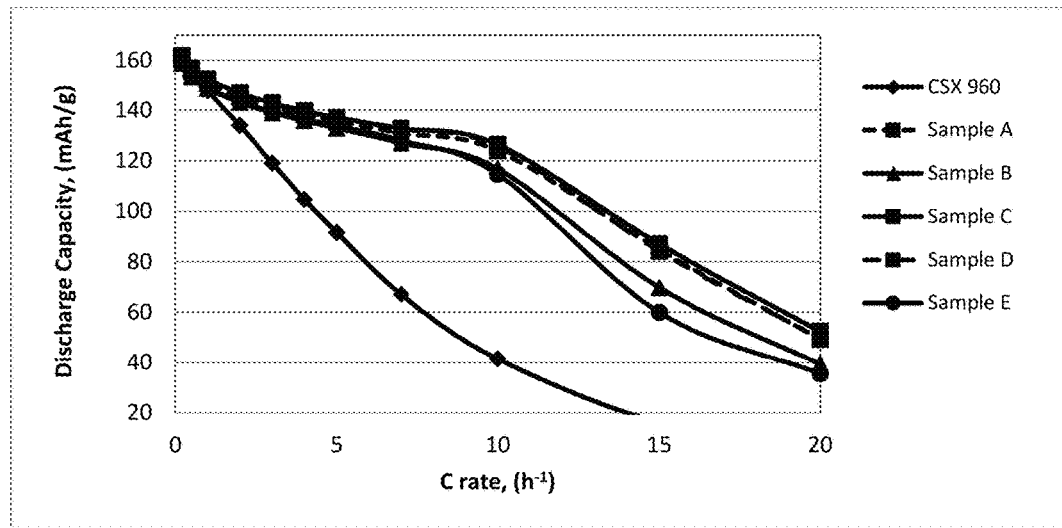
FIG. 4 shows discharge curves for coin cells with various conductive carbon additives at 4 wt % loading as a function of C-rate. The cathode composition is NCM 111:CCA:PVDF=93:4:3.

FIG. 4 shows discharge curves for coin cells with various conductive carbon additives at 4 wt % loading as a function of C-rate. The cathode composition is NCM 111:CCA:PVDF=93:4:3.

FIGS. 3 and 4 indicate that cathode specific capacity is preserved at higher rates of discharge current when Samples A-D are used, at either 2 or 4 wt % loading. This indicates that the cells with Samples A-D have improved continuous discharge power capability, with Samples C and D having performed the best in this test. This feature may enable small battery size requirements to achieve specific power targets, and may be beneficial for cranking large or high compression diesel engines, such as those used in trucks.

Hybrid Pulse Power Capability (HPPC) Measurements:

After evaluating the C-rate capability of the cells, they were tested for HPPC. A full description of the HPPC test can be found in US DOE Vehicle Technologies Battery Test Manual for Plug-In Hybrid Electric Vehicles, 2008, Idaho National Lab INL/EXT-07-12536.

Fully recharged cells were submitted to 5C, 10 s discharge current pulses, 40 s rests, 3.75C, 10 s charge current pulses, by 10% state of charge decrements achieved by 1C discharge steps of 6 minutes. From this test, the DC-IR and ionic discharge resistances were calculated using Ohm's law. DC-IR is based on the instant Ohmic drop, and ionic resistance is the end of pulse resistance minus instant Ohmic drop.

Figure 5:
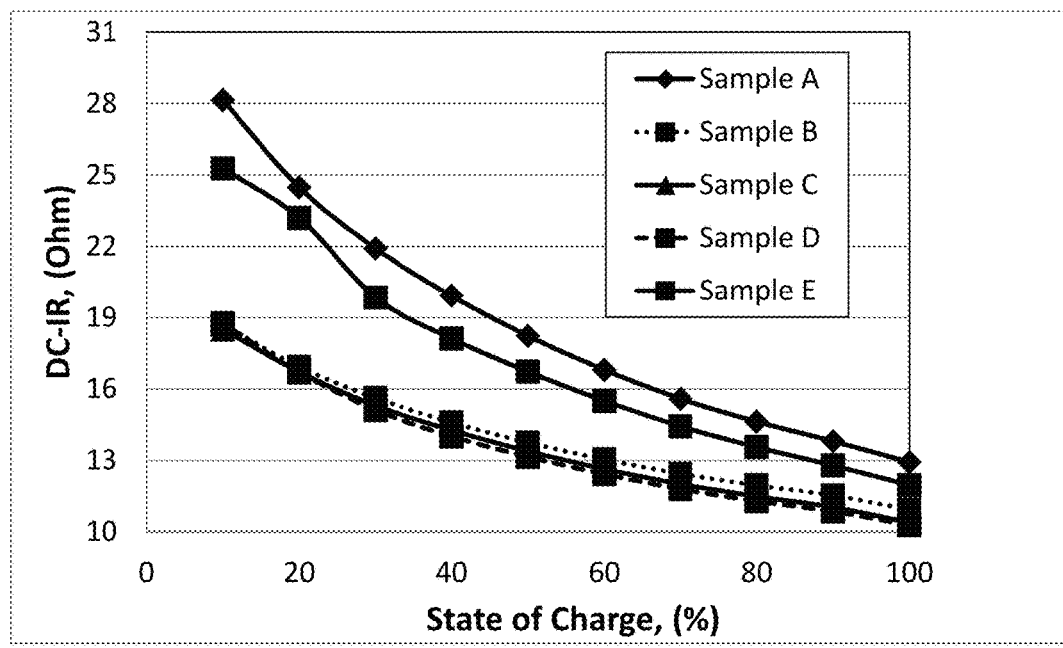
FIG. 5 is a plot of the DC-IR component of the total resistance as a function of state of charge for cells having different carbon conductive additives at 2 wt % loading (NCM 111:CCA:PVDF=96.5:2:1.5).
Figure 6:
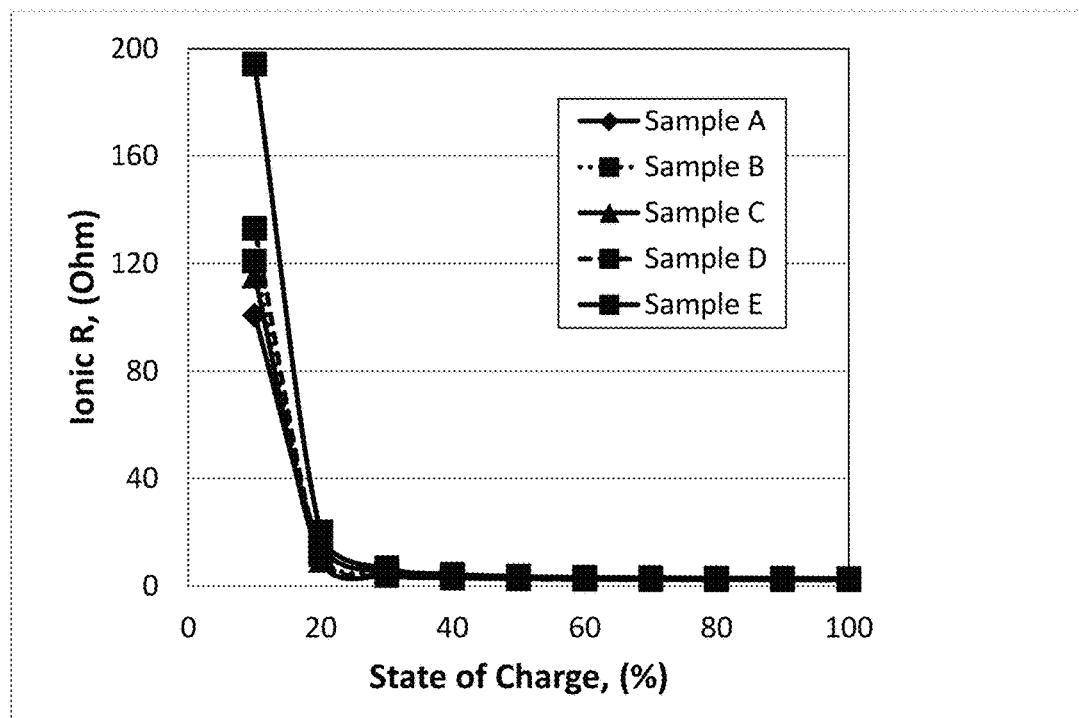
FIG. 6 is a plot of the ionic component of the total resistance as a function of state of charge for cells having different carbon conductive additives at 2 wt % loading (NCM 111:CCA:PVDF=96.5:2:1.5).
Figure 7:
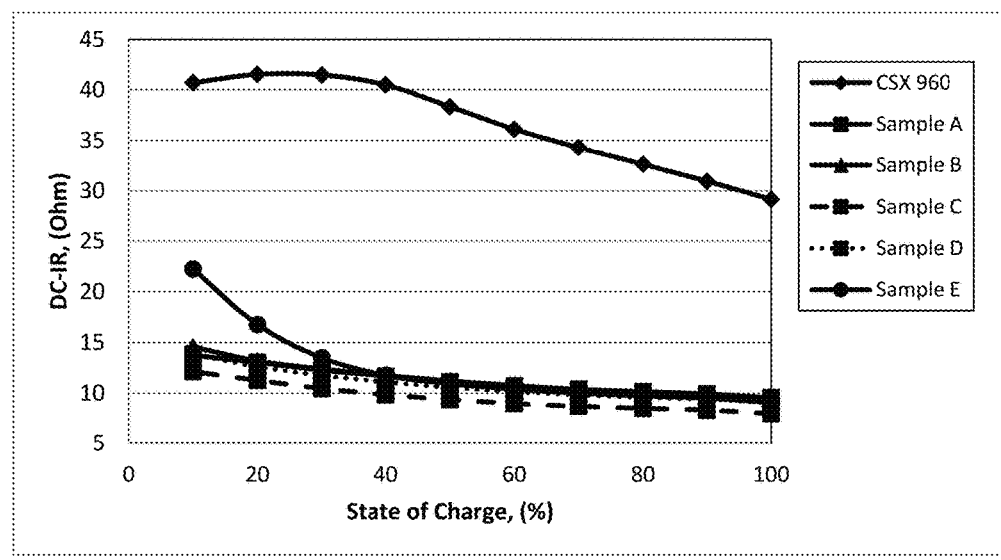
FIG. 7 is a plot of the DC-IR component of the total resistance as a function of state of charge for cells having different carbon conductive additives at 4 wt % loading (NCM 111:CCA:PVDF=93:4:3).
Figure 8:
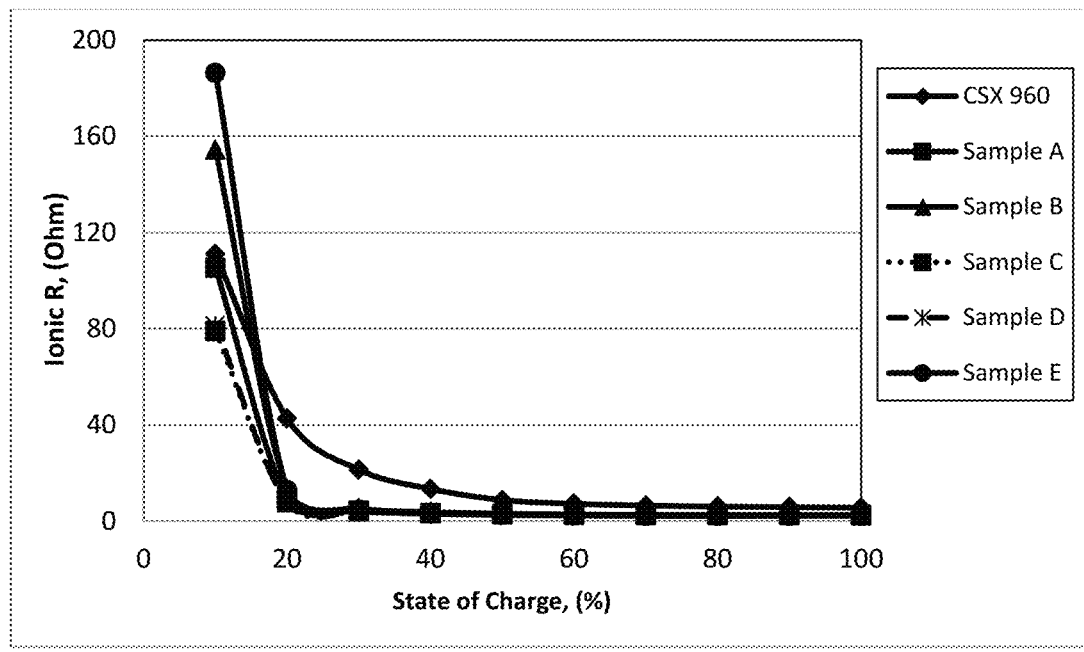
FIG. 8 is a plot of the ionic component of the total resistance as a function of state of charge for the cells having different carbon conductive additives at 4 wt % loading (NCM 111:CCA:PVDF=93:4:3).

Both DC-IR and ionic resistance have been measured at 2 wt % and 4 wt % CCA loading and are shown on FIGS. 5-8. FIG. 5 is a plot of the DC-IR component of the total resistance as a function of state of charge for cells having different carbon conductive additives at 2 wt % loading (NCM 111:CCA:PVDF=96.5:2:1.5). FIG. 6 is a plot of the ionic component of the total resistance as a function of state of charge for cells having different carbon conductive additives at 2 wt % loading (NCM 111:CCA:PVDF=96.5:2:1.5). FIG. 7 is a plot of the DC-IR component of the total resistance as a function of state of charge for cells having different carbon conductive additives at 4 wt % loading (NCM 111:CCA:PVDF=93:4:3). FIG. 8 is a plot of the ionic component of the total resistance as a function of state of charge for the cells having different carbon conductive additives at 2 wt % loading (NCM 111:CCA:PVDF=93:4:3).

As shown in FIGS. 5-8, at 2 and 4 wt % CCA, Samples B, C and D have the lowest DC-IR, while the ionic resistance at low states of charge is also lower for these samples. This indicates better discharge pulse power capability over all states of charge, which is especially useful for vehicle acceleration in automotive application. The fact that electronic ionic resistances are lower at lower states of charge enables an increase in the useful range of battery state of charge. This may, for instance, enable maintaining of the start-stop function of a vehicle in situations where the battery is at a low state of charge.

Example 6

This Example summarizes the evaluation results from the fast charging test for Sample B and Sample E.

Fast charging test was performed on half coin-cells (with NCM(111):CB:PVDF=96.5:2:1.5 cathode, 30 mg/cm$^2$ loading and calendered to 3 g/cc) by charging cells in 1 h (1C) and 20 min (3C) rates, and measuring their discharge capacity in 2 h discharge rate. Although graphite anodes are generally limiting fast charging capability of Li-ion batteries, this test is useful to understand the electrochemical and transport properties of the cathodes.

Figure 9:
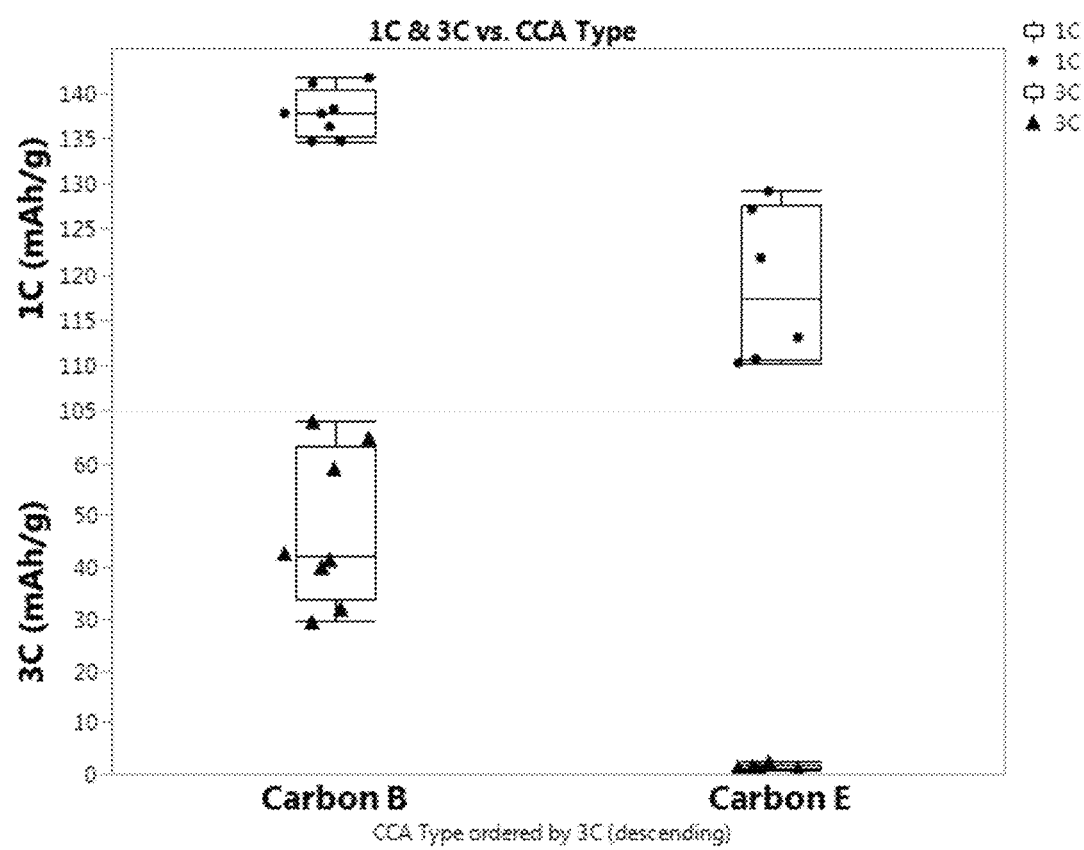
FIG. 9 summarizes evaluation results from fast charging tests of two conductive additives.

As shown in FIG. 9, the cells comprising carbon B can be partially charged at 20 min rate (3C), while carbon E cannot. At 1C charging rate, cells comprising carbon B can be charged to 135 mAh/g, while those having currently used carbon E can only be charged to 115 mAh/g. If the fast charging limitations of graphite anodes are overcome in the future (or a different anode is used), conductive additive B may enable faster charging capability to a lithium ion battery, which is of significant importance to both industry and consumers.

The use of the terms "a" and "an" and "the" is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All publications, applications, ASTM standards, and patents referred to herein are incorporated by reference in their entirety.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An electrode for an energy storage device, comprising:
a lithium ion-based electroactive material; and
carbon black particles having (a) a Brunauer-Emmett-Teller (BET) surface area ranging from 70 to 120 $m^2/g$; (b) an oil absorption number (OAN) ranging from 180 to 310 mL/100 g; (c) a surface energy less than or equal to 15 $mJ/m^2$; and (d) either an $L_a$ crystallite size less than or equal to 29 Å, or a primary particle size less than or equal to 24 nm.

2. The electrode of claim 1, wherein the carbon black particles have both an La crystallite size less than or equal to 29 Å, and a particle size less than or equal to 24 nm.

3. The electrode of claim 1, wherein the carbon black particles have a particle size less than or equal to 24 nm.

4. The electrode of claim 1, wherein the carbon black particles have a surface energy less than or equal to 10 $mJ/m^2$.

5. The electrode of claim 1, wherein the carbon black particles have a % crystallinity ($I_G/I_{G+D}$) less than or equal to 45%, as determined by Raman spectroscopy.

6. The electrode of claim 1, wherein the carbon black particles have an oxygen content of less than or equal to 1 wt %.

7. The electrode of claim 1, wherein the carbon black particles have a dispersability of less than one micron ($D_{50}$ by volume).

8. The electrode of claim 1, wherein the carbon black particles have a ratio of statistical thickness surface area to Brunauer-Emmett-Teller surface area (STSA:BET) greater than 0.95:1.

9. The electrode of claim 1, wherein the carbon black particles have a BET surface area ranging from 90 to 110 $m^2/g$.

10. The electrode of claim 1, wherein the carbon black particles have an OAN ranging from 220 to 270 mL/100 g.

11. The electrode of claim 1, wherein the carbon black particles have an $L_c$ crystallite size ranging from 17 to 27 Angstroms.

* * * * *